Nov. 10, 1931.  G. E. PARKER ET AL  1,831,191
BRAKE
Original Filed Aug. 8, 1924

INVENTORS
*Guy E. Parker and
Arthur H. Stahlhuth*
Blackmore, Spencer & Flint
ATTORNEYS Patented Nov. 10, 1931

1,831,191

UNITED STATES PATENT OFFICE

GUY E. PARKER AND ARTHUR H. STAHLHUTH, OF DETROIT, MICHIGAN, ASSIGNORS, BY MESNE ASSIGNMENTS, TO BENDIX BRAKE COMPANY, OF CHICAGO, ILLINOIS, A CORPORATION OF ILLINOIS

BRAKE

Application filed August 8, 1924, Serial No. 730,941. Renewed March 23, 1931.

This invention relates to brakes, and is illustrated as embodied in an internal expanding brake for an automobile.

One object of the invention is to secure a reliable and efficient brake having a greater "wrapping", or self-applying, action when the automobile is moving forward than when it is moving backward. This gives a greater braking action than the conventional two-shoe brake when the vehicle is moving forward, at which time the greatest braking effect is required, while at the same time holding the automobile against rearward movement much more firmly than a full-wrapping brake. In one desirable arrangement, the shoe which has a "wrapping" effect on rearward movement extends around less than half of the drum, e. g. 120°, while a jointed friction member including a pair of pivotally-connected rigid shoes gives the requisite powerful braking effect on forward movement.

Figure 1:
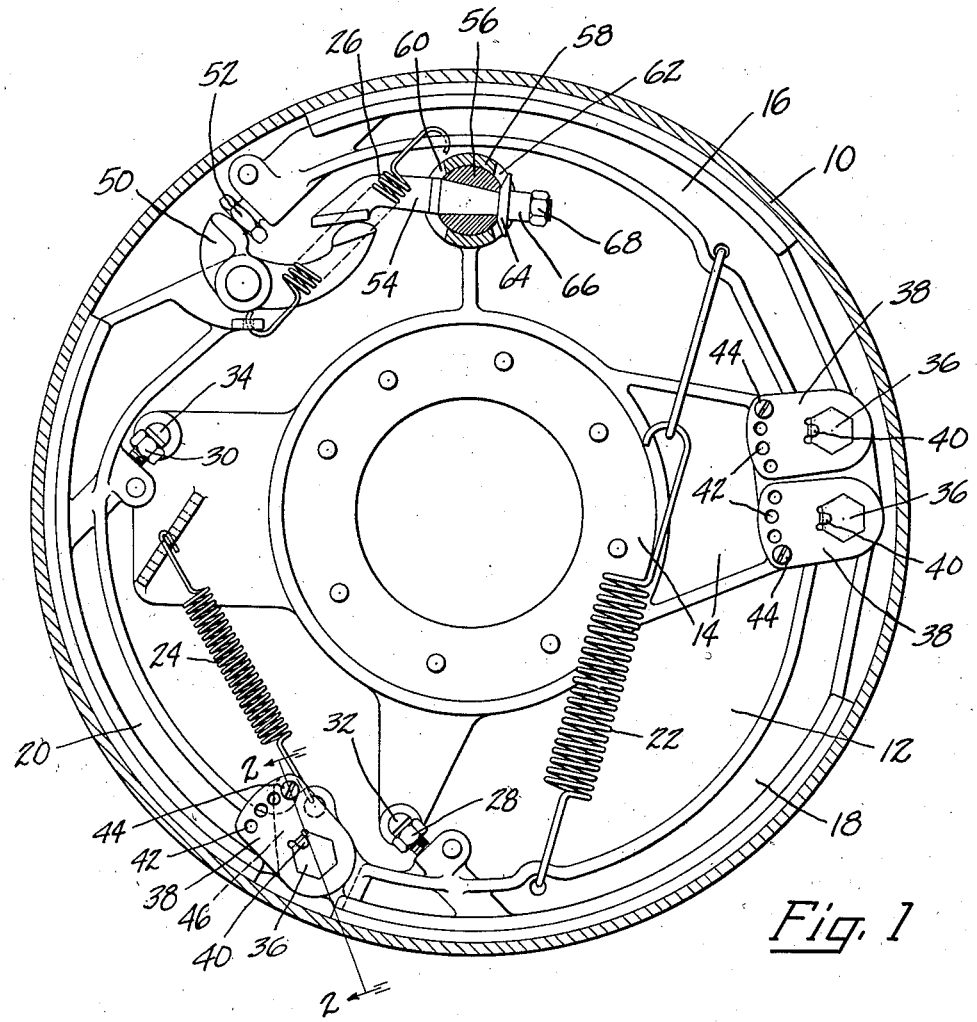
Figure 2:
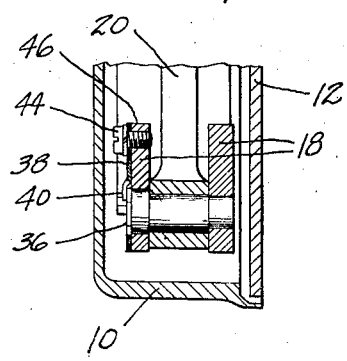

Other features of the invention relate to a novel arrangement for expanding a friction brake device, including a lever pivoted on one end of the device and engaging a stop carried by the other end of the friction device, and to a novel eccentric adjustment for a brake shoe pivot. These and other desirable novel features of construction will be apparent from the following description of one illustrative embodiment of the invention shown in the accompanying drawings, in which:

Figure 1 is a vertical section through the brake, showing most of the movable parts in side elevation; and Figure 2 is a section on the line 2—2 of Figure 1, showing the eccentric adjustment.

In the arrangement selected for illustration, the brake comprises a drum 10 carried by a front or rear wheel (not shown), and a dust plate 12 closing the open inner face of the drum and riveted or otherwise secured to a spider 14 carried by the front wheel knuckle or by the rear axle housing, as the case may be.

Inside the drum is an expansible friction device including a rigid, friction-faced shoe 16, arranged to have a "wrapping" action (i. e. wedging itself against the drum) when the automobile is moving backward, and which extends approximately 120° around the drum. As is well known, a shoe arranged in this manner is much less effective when the automobile is moving forward. Most of the braking in this latter case is done by a jointed friction-faced member including two or more rigid shoes 18 and 20. The three shoes are urged by springs 22, 24, and 26 to a contracted idle position determined by adjustable threaded stops 28 and 30 engaging the flat sides of semi-cylindrical projections formed on studs 32 and 34 carried by the spider 14.

Shoes 16 and 18 are anchored to spider 14, and shoes 18 and 20 are pivotally connected, by novel adjustable connections each including a headed eccentric bolt 36, forming a fulcrum member. A sheet metal arm 38 has a polygonal opening embracing the head of member 36, and a finger 40 bent to engage the top of the head. Each arm 38 has a plurality of openings 42, spaced circumferentially with respect to member 36, any one of which may be engaged by a pin 44 threaded or otherwise secured to spider 14 (for shoes 16 and 18) or to a tail 46 formed on shoe 18 (for shoe 20). Thus the eccentric member 36 may be held in any desired adjusted angular position by engaging pin 44 with one or another of openings 42.

On the free end of shoe 20 is pivoted a lever 50 engaging a stop 52 adjustably threaded into the free end of shoe 16. The tail of lever 50 is engaged by a rock member 54 having a conical shank seated in a corresponding socket in a shaft 56 turning in a bearing 58. The bearing 58 is cut away at opposite sides at 60 and 62 to afford clearance for member 54. Movement of member 54 is limited by engagement with opposite sides of cut-away side 62 by a stop or washer 64 held by a collar 66 engaged by a nut 68 threaded on the end of member 54, and clamping the conical part of said member in the socket in shaft 56.

While one illustrative embodiment has been described in detail, it is not the intention to limit the scope of the invention to that particular embodiment, or otherwise than by the terms of the appended claims.

We claim:

1. A brake comprising, in combination, a drum, a central shoe, an end shoe at each end of the central shoe, means operated by one of the end shoes for forcing the central shoe against the drum, and a floating operating device for forcing the two end shoes against the drum.

2. A brake comprising, in combination, a drum, a central shoe, an end shoe at each end of the central shoe, means operated by one of the end shoes for forcing the central shoe against the drum, and a floating operating device mounted on the end of one end shoe and engaging the end of the other end shoe for forcing the two end shoes against the drum.

3. A brake comprising, in combination, a drum, a central shoe, an end shoe at each end of the central shoe, means operated by one of the end shoes for forcing the central shoe against the drum, and an operating lever pivoted on one of the end shoes and engaging the other end shoe to force the end shoes against the drum.

4. A brake comprising, in combination, a drum, a central shoe and a pair of end shoes, one at each end of the central shoe, means operated by one end shoe for forcing the central shoe against the drum, a spring connecting the other end shoe and the central shoe, and another spring connecting the two end shoes.

5. A brake comprising, in combination, a drum, a central shoe and an end shoe at each end of the central shoe, all arranged within the drum, means for forcing the end shoes apart against the drum, means operated by the first end shoe for forcing the central shoe against the drum, and means yieldingly urging the three shoes away from the drum including a spring connecting the central shoe and the second end shoe.

6. A brake comprising, in combination, a drum, a pair of shoes anchored at their adjacent ends, an unanchored shoe connected to the first of the anchored shoes, a stop, a spring holding the unanchored shoe yieldingly against the stop, and means for forcing the unanchored shoe and the second anchored shoe against the drum, the unanchored shoe forcing the first anchored shoe against the drum.

7. A brake comprising, in combination, a drum, a shoe anchored at one end within the drum, a floating shoe arranged at the unanchored end of the anchored shoe, means to force the floating shoe against the drum, and a floating pivot connection operated by the floating shoe to force the anchored shoe against the drum, the connection being adjustable to separate the shoes more or less to take up for wear.

8. A brake comprising, in combination, a drum, a shoe anchored at one end within the drum, a floating shoe arranged at the unanchored end of the anchored shoe, a third shoe at the anchored end of the anchored shoe, means to force the floating shoe and the third shoe against the drum, and a connection between the floating and anchored shoes, the floating shoe being operated to force the anchored shoe against the drum, the connection being adjustable to separate the shoes more or less to take up for wear.

9. A brake comprising, in combination, a central shoe, a pair of end shoes arranged respectively at the ends of the central shoe and one of which is connected to the central shoe to operate it, and anchoring means for the adjacent ends of the central shoe and the unconnected shoe which is adjustable to take up for wear of the shoes.

10. A brake comprising, in combination, a drum, a shoe anchored at one end within the drum, a floating shoe arranged at the unanchored end of the anchored shoe, a third shoe at the anchored end of the anchored shoe, a floating lever means to force the floating shoe and the third shoe against the drum and a connection between the floating and anchored shoes, the floating shoe being actuated to force the anchored shoe against the drum, the aforementioned connection being adjustable to separate the shoes more or less to take up for wear.

11. A brake comprising a drum, a shoe anchored at one end within the drum, a floating shoe arranged at the unanchored end of the anchored shoe, lever means to force the floating shoe against the drum and a floating pivot connection operated by the floating shoe to force the anchored shoe against the drum, said connection being adjustable to separate the shoes more or less to take up for wear and maintain a substantially constant operating movement of said lever means.

12. A brake comprising, in combination, a central shoe, a pair of end shoes arranged respectively at the ends of the central shoe, one of which is connected to the central shoe to operate it, a lever means interposed between the ends of the end shoes together with adjustable anchoring means for the adjacent ends of the central shoe and the unconnected shoe, which adjustable means compensates for wear of the shoes.

In testimony whereof we affix our signatures.

GUY E. PARKER.
ARTHUR H. STAHLHUTH.